W. C. HEDGCOCK.
BRAKE EQUALIZER CENTERING DEVICE.
APPLICATION FILED JULY 5, 1917.
1,283,757. Patented Nov. 5, 1918.
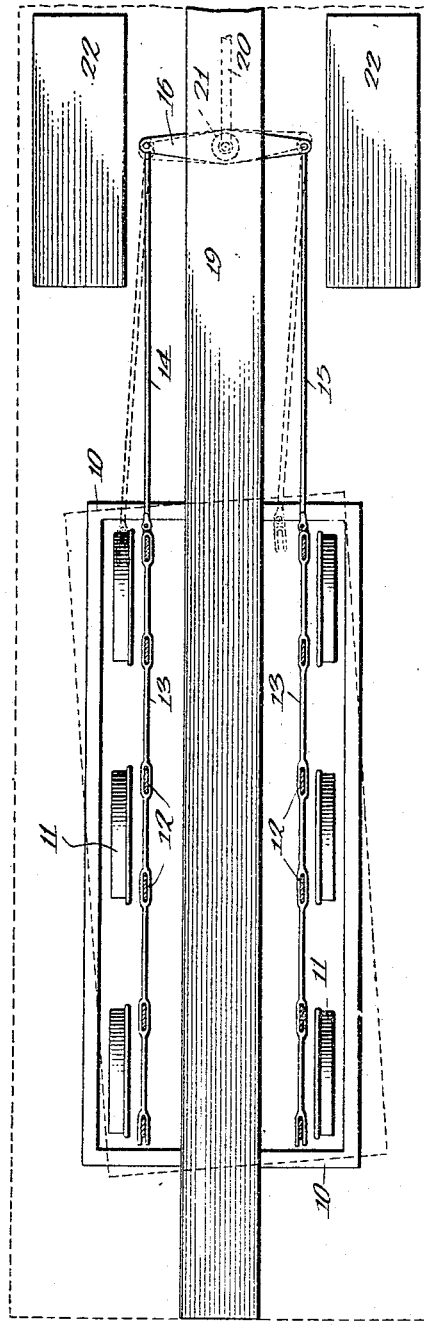
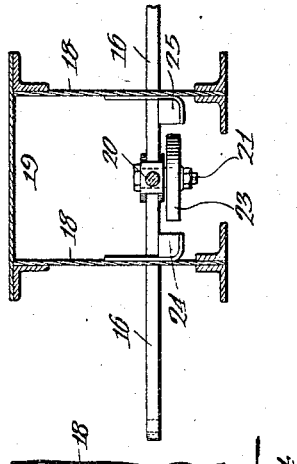
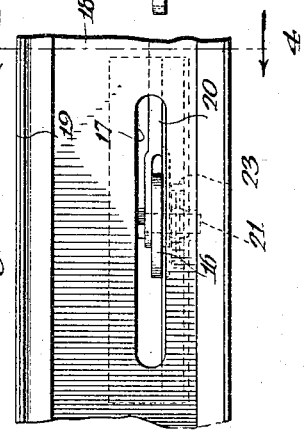
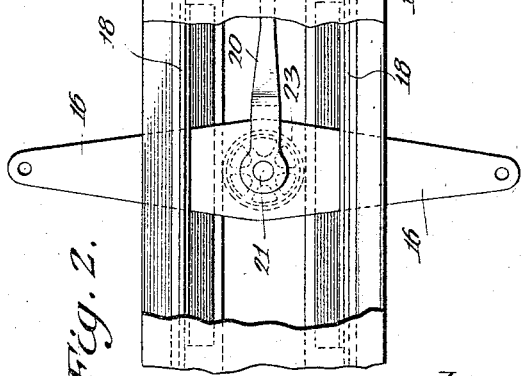
C. M. Oberbeck.
Chas. L. Byron.
Inventor:
William C. Hedgcock
By Wilkinson & Huxley
Attys.

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE-EQUALIZER-CENTERING DEVICE.

1,283,757.  Specification of Letters Patent.  Patented Nov. 5, 1918.

Application filed July 5, 1917. Serial No. 178,582.

*To all whom it may concern:*

Be it known that I, WILLIAM C. HEDGCOCK, a citizen of the United States, and resident of Chicago, in the county of Cook and State of Illinois, have invented certain new and useful Improvements in Brake-Equalizer-Centering Devices, of which the following is a specification.

This invention relates to brake equalizing mechanism and more particularly to centering means therefor.

One object of the invention is to maintain the brake equalizer and its associated parts in a substantially central position.

Another object is to provide a brake equalizing system which will in no wise interfere with other parts of the associated structure and which is adapted to meet all the requirements for successful commercial operation.

These and other objects are accomplished by providing in brake equalizer mechanism, the combination of a supported equalizing member, guide means, and means operatively associated with said equalizing member and guide means for maintaining the equalizing member in a central position.

The invention is illustrated on the accompanying sheet of drawings in which:

Figure 1 is a plan view of a car truck equipped with suitable braking mechanism and provided with my improved brake equalizing centering means;

Fig. 2 is a fragmentary plan view showing the means for supporting and guiding the brake equalizer;

Fig. 3 is a fragmentary side elevation disclosing the same arrangement, and,

Fig. 4 is a sectional view taken in the plane of line 4—4 of Fig. 3 and showing the arrangement whereby the brake equalizer is maintained in a central position.

The various novel features of my invention will be apparent from the following description and drawings, and will be particularly pointed out in the appended claims.

The invention is illustrated in connection with a car truck having the usual frame 10, carried by wheels 11, to which a braking effort is applied by a suitable braking mechanism, including oppositely arranged sets of levers 12, which receive their braking motion from pull rods 13. These pull rods are connected by oppositely arranged links 14—15 to opposite ends of an equalizing member 16, which preferably is supported in longitudinally extending slotted portions 17 formed in oppositely arranged vertical plates 18 of the underframe 19. A pull rod 20 is pivotally connected to the equalizer 16 by a pin 21 which passes down through registering openings in the jaw of the pull rod and equalizer, the pull rod in turn being operatively connected to the brake cylinder.

By means of the arrangement thus far described it is apparent that when the truck swivels, as for example, in rounding a curve, to a position shown in dotted lines in Fig. 1, the lateral movement of the truck brake system tends to pull the transverse equalizer 16 in a lateral direction across the car, due to the tendency of the lines of forces to act in the straightest and most direct manner possible. This tendency is not harmful where there are no articles or structures under the car body with which the equalizer and its associated links or pull rods may come in contact. However, where battery boxes, tanks, or any other articles or structures 22 are located on the car body adjacent to the transverse equalizer and its associated links, the equalizer or associated parts may be moved over far enough to interfere with these boxes or other equipment. It is therefore necessary in such cases to provide some means for keeping the equalizer in a substantially central position, or in other words, to limit lateral movement of the equalizer. To accomplish this result I have secured to the lower extended end of the pin 21 a wheel or roller 23 which upon a lateral movement of the equalizer 16 is adapted to engage guide members 24—25, which are secured to the side plates 18 of the underframe. The guide members include wooden strips which make the movement of the equalizer as noiseless as possible.

By means of this arrangement it is apparent that lateral movement in either direction of the equalizer 16 is limited, the limiting factor being the distance between the roller 23 and the coöperating guides. Due to the fact that a roller is provided which engages the guide members 24—25, substantially no frictional resistance is occasioned at this point when the equalizer and pull rods are moved in a direction lengthwise of the car body, that is, on the longitudinal center line of the car to apply the brakes.

It is apparent that there may be various modifications of the invention herein particularly shown and described, and it is my intention to cover all such modifications which do not involve a departure from the spirit and scope of the invention as set forth in the following claims.

I claim:

1. In brake equalizer mechanism, the combination of a single supported equalizing member, guide means, and means operatively and centrally associated with said equalizing member and guide means for maintaining the equalizing member in a central position.

2. In brake equalizer mechanism, the combination of a supported equalizing member, guide means, and means centrally carried by the equalizing member and coöperating with said guide means for permitting but limiting lateral movement of the equalizing member.

3. In brake equalizer mechanism, the combination of a supported equalizing member, guide means, and roller means centrally associated with the equalizing member and coöperating with said guide means for limiting lateral movement of the equalizing member.

4. In brake equalizer mechanism, the combination of a supported equalizing member, roller means operatively and centrally carried by the equalizing member, and coöperating members associated therewith for limiting lateral movement of the equalizing member.

5. In brake equalizer mechanism, the combination of a support, an equalizer carried thereby, and means centrally associated with the equalizer and engageable with the support for permitting but limiting lateral movement of the equalizer.

6. In brake equalizer mechanism, the combination of a support, an equalizer carried thereby, and anti-friction means centrally carried by the equalizer engageable with the support for limiting lateral movement of the equalizer.

7. In brake equalizer mechanism, the combination of a single supported equalizing member, guide means, and means operatively associated with said equalizing member located between the guide means for maintaining the equalizing member in a central position.

8. In brake equalizer mechanism, the combination of a supported equalizing member, guide means, and roller means carried by the equalizing member between the guide means and coöperating with said guide means for limiting the lateral movement of the equalizing member.

9. In brake equalizer mechanism, the combination of a frame, an equalizer carried thereby, guide means carried by said frame, and means centrally carried by the equalizer engageable with said means for permitting but limiting lateral movement of the equalizer.

10. In brake equalizer mechanism, the combination of a frame, an equalizer carried thereby, guide members carried by said frame, and a roller centrally carried by said equalizer and engageable with said guide members for limiting lateral movement of the equalizer.

11. In brake equalizer mechanism, the combination of a frame, an equalizer carried thereby, guide members carried by said frame, and means carried by the equalizer between and engageable with said guide means for permitting but limiting lateral movement of the equalizer.

12. In brake equalizer mechanism, the combination of a frame, an equalizer carried thereby, guide members carried by the frame, a pull rod, a pin connecting the pull rod and equalizer, and a roller mounted on said pin and being engageable with said guide members for limiting lateral movement of the equalizer.

13. In combination, truck wheels, braking mechanism operatively associated therewith, including oppositely arranged pull rods, a single equalizer to which said pull rods are connected, and means centrally associated with the equalizer for limiting lateral movement of said equalizer.

14. In combination, a frame, wheels carrying the same, braking mechanism operatively associated with the wheels and including oppositely arranged pull rods, a single equalizer to which said pull rods are connected, and means centrally carried by said equalizer engageable with the frame for limiting lateral movement of the equalizer.

15. In combination, a frame, wheels carrying the same, braking mechanism operatively associated with the wheels and including oppositely arranged pull rods, a single equalizer to which said pull rods are connected, guide means, and means carried by said equalizer between and engageable with the guide means for limiting lateral movement of the equalizer.

Signed at Chicago, Illinois, this 30th day of June, 1917.

WILLIAM C. HEDGCOCK.

Witnesses:
AMANDA F. WADE,
CHAS. L. BYRON.

Copies of this patent may be obtained for five cents each, by addressing the "Commissioner of Patents, Washington, D. C."